United States Patent
Stoll

[11] 3,826,157
[45] July 30, 1974

[54] ROLLER/BALL TRANSMISSION

[76] Inventor: Charles C. Stoll, Rt. 1, Selbyville, Del. 19975

[22] Filed: Aug. 11, 1972

[21] Appl. No.: 279,773

[52] U.S. Cl. ................................. 74/198, 64/7
[51] Int. Cl. ........................................ F16h 15/26
[58] Field of Search ................. 64/7, 8; 74/198, 200

[56] References Cited
UNITED STATES PATENTS

| | | | |
|---|---|---|---|
| 2,682,776 | 7/1954 | Morgan | 74/198 |
| 2,959,971 | 11/1960 | Salomon | 74/198 |
| 3,039,328 | 6/1962 | Christenson | 74/198 |
| 3,154,957 | 11/1964 | Kashihara | 74/198 |

Primary Examiner—Samuel Scott
Assistant Examiner—Randall Heald
Attorney, Agent, or Firm—Cushman, Darby & Cushman

[57] ABSTRACT

A power transmission including an input power source having an input shaft, a sphere connected through a gear system to the input shaft so as to rotate about its own axis when the input shaft is rotating, the axis of the sphere being in a plane perpendicular to the axis of the input shaft, and a control mechanism associated with the sphere for adjusting the orientation of the sphere's axis within the plane referred to. The transmission further includes an output spider, or ring including a plurality of rollers frictionally engaging the sphere, and therethrough transmitting a portion of the motion of the sphere to the output shaft which is attached to the spider. By controlling the orientation of the rotational axis of the sphere, the relative speeds of the spider and the sphere may be varied, and therefore the speed of the output shaft may be varied with respect to that of the input shaft. A loading device is provided to retain the axis of the sphere in a desired position but is set to release upon a high output torque so as to prevent scoring between the rollers and the surface of the sphere.

9 Claims, 8 Drawing Figures

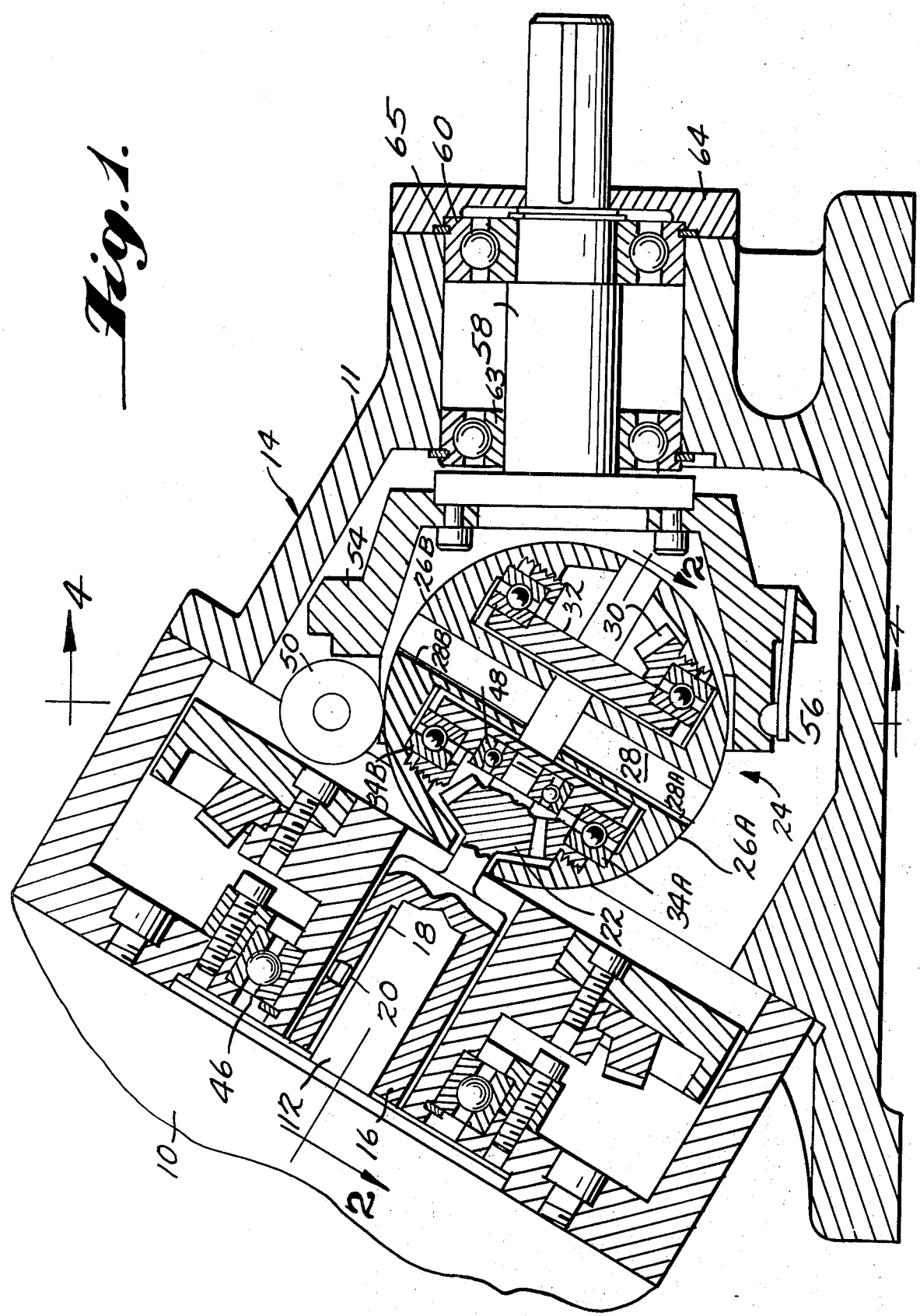

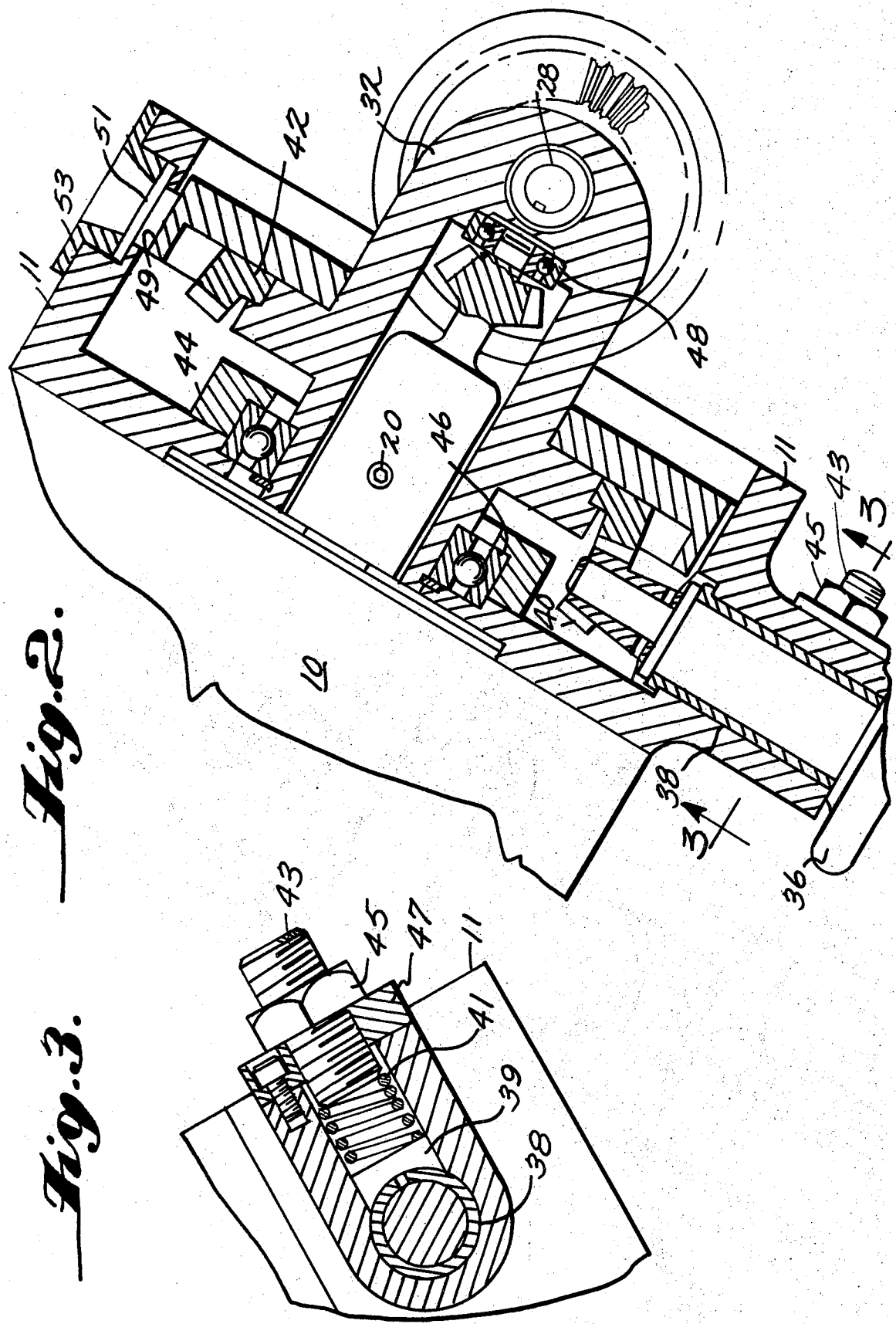

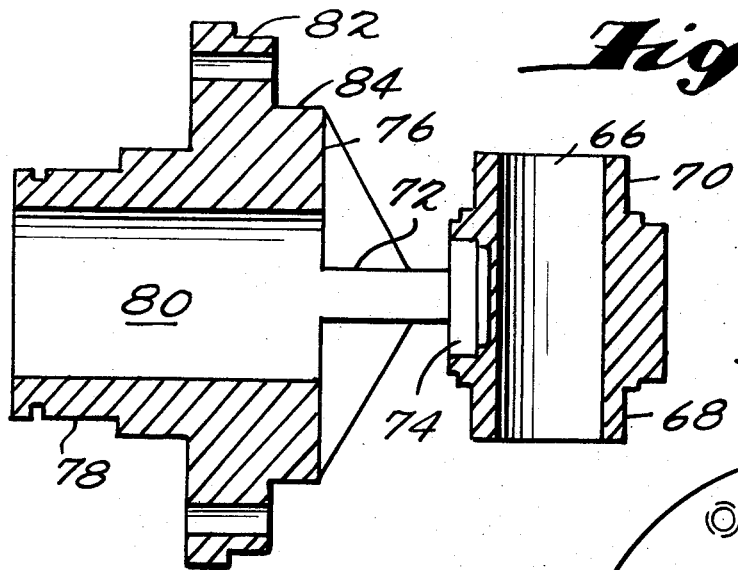
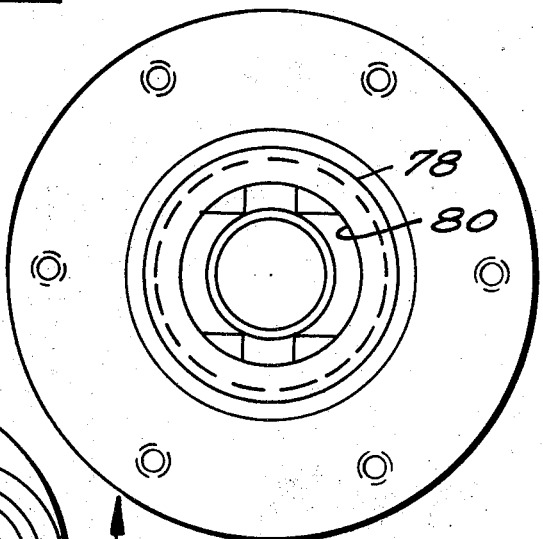
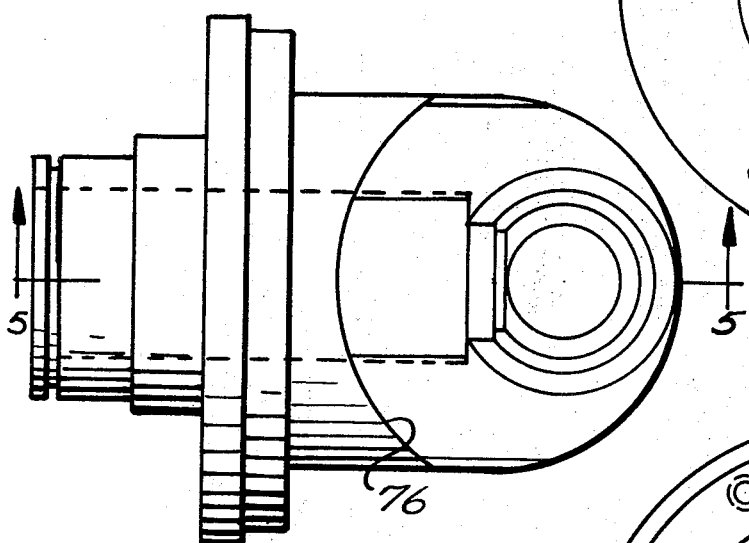
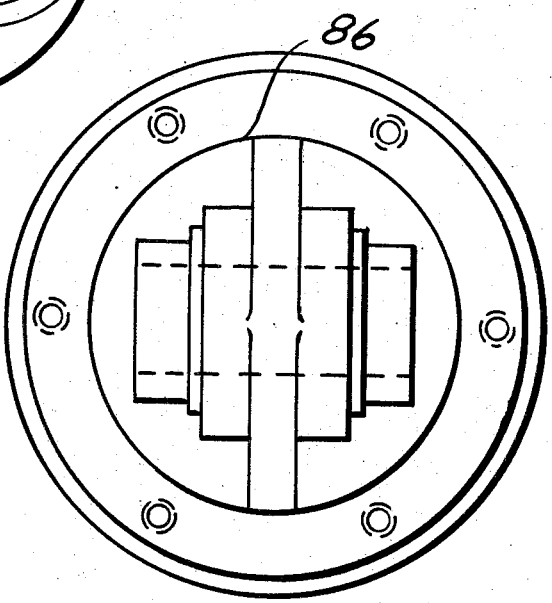

ROLLER/BALL TRANSMISSION

BACKGROUND OF THE INVENTION

1. Field of the Invention

This invention relates generally to power transmission devices and more specifically to transmissions in which a rotating body of generally spherical configuration is surrounded by a concentric ring or mutor which contacts the sphere through roller elements to transfer power therefrom. Such transmissions are typically provided with means for varying the relative position between the rotational axis of said sphere and said ring so as to control the speed of the output shaft from said transmission relative to the input shaft to said transmission.

2. Description of the Prior Art

In one known arrangement of the transmission devices of the type contemplated herein, variable speed, ball transmission and ring type output shafts are universally jointed to a motor and to a device utilizing power respectively. In this type of device an externally operated engagement means shifts the relative position of a sphere coaxially mounted upon the input shaft and motor coaxially mounted upon the output shaft to thereby vary the output shafts speed. Such an arrangement is subject to considerable wear in the universal joints and is limited in the amount of power which can be transmitted thereby because of its universal joints. As a result, the prior art advanced beyond this arrangement to a second design in which both input and output shafts were axially fixed although rotatably mounted in the transmission housing. In this design the mutor is positioned about a sphere having a stationary axis of rotation while the mutor is mounted to change orientation vis-a-vis the sphere's axis of rotation, the mutor's output being transferred to the output shaft through a gearing system. In operation this design started at a zero output and then rose automatically to a maximum output for a given speed input and then was locked at the maximum speed output until external means released the mutor to return to a zero point. In other words, it was impossible to obtain a steady output speed from this design between zero and maximum.

Furthermore, in either of the above described arrangements, it was impossible to obtain a negative speed of the output shaft compared to the direction of the input shafts rotation without the addition of separate gearing, and in both of the above arrangements no safety feature is incorporated to prevent scoring between the surface of the sphere and the gripping means of the mutor in the event of a heavy torque requirement on the output shaft.

SUMMARY OF THE INVENTION

This invention employs the basic idea of transmitting a portion of the rotational motion of a sphere about one of its axes to an output shaft through a ring of rollers frictionally engaging the sphere, and varying the output speed by varying the angular relationship between the sphere's rotational axis and the ring of rollers, which has been utilized in the prior art. Certain additional objectives have been met in the subject invention.

First, a firm theoretical basis has been established for the principles used. This involved developing the law that when a sphere rotates about an axis, with an equatorial velocity of V, the component of this velocity along any great circle whose axis makes an angle $\alpha$ with the rotational axis of the sphere is V cos $\alpha$. Therefore, we can see that the sphere's velocity along the great circle which includes the contact points of the rollers may be varied by varying $\alpha$. This law has not been found cited in related inventions. This velocity is transmitted by friction to the output shaft. The component of the sphere's velocity perpendicular to the circle of roller contact points results merely in harmless turning of each roller back and forth on its own axis.

Second, a means is included wherein the center of the sphere lies on the fixed input axis, but is rotated by the input shaft about a diameter perpendicular to the input axis, and this rotational axis of the sphere may be oriented to any position about the input axis by an external control.

Third, the output axis also passes through the center of the sphere, but at an angle with the input axis. The axes of the individual rollers, and their points of contact with the sphere are included in a plane through the center of the sphere and perpendicular to the output axis. With the foregoing arrangement of parts, the angle $\alpha$ between the output axis and the rotational axis of the sphere may, by varying the orientation of the rotational axis of the sphere about the input axis, be continuously varied from a minimum between 0° and 90°, through 90°, to a maximum between 90° and 180°. Thus, cosine $\alpha$ varies from a positive value, through zero, to a negative value. Therefore, the output speed of the transmission may be continuously varied from a positive value, through zero, to a negative value by external control.

Fourth, with the firegoing arrangement of parts, it has been deduced that there is a restoring torque tending to cause the rotational axis of the sphere to assume a position at 90° with the output axis, that is, angle $\alpha$ = 90°, whenever a torque load exists on the output shaft. In other words, there is an inherent tendency for the output speed to fall to zero when the output shaft is loaded. This results in a very desirable aspect of this invention: a precise position of the external speed control which corresponds to exact zero speed. This feature has been impossible to achieve in existing continuously variable speed devices.

Fifth, it has been further deduced that the abovementioned restoring torque at any speed setting of the external control, is roughly proportional to the output torque. Therefore, it is possible to hold the external control at a given speed setting with an adjustable restraining torque. By making this restraining torque a value to be overcome when the output torque becomes unacceptably high, we introduce an effective overload safety means.

Sixth, with the control mechanism in the position for zero output speed, that is, with the rotational axis of the sphere at 90° with the output axis, slight motion of the control will produce small, stable output speeds in one direction or the other, with full torque available. These conditions are not achieved in existing continuously variable transmissions.

BRIEF DESCRIPTION OF THE DRAWINGS

A preferred embodiment of the applicant's invention will now be described with reference to the following drawings in which:

FIG. 1 is a center line sectional side view of a transmission in accordance with one embodiment of the invention;

FIG. 2 is center line sectional view along the line 2—2 shown in FIG. 1 excluding the housing and output assembly of the transmission for clarity;

FIG. 3 is a sectional view along the line 3—3 in FIG. 2 with elements omitted for clarity.

FIG. 5 is a cross-sectional view along the line 5—5 shown in FIG. 6, of the bearing mount of the transmission.

FIG. 6 is a top plan view of the bearing mount of the transmission.

FIG. 7 is a vertical plan view looking toward an end of the bearing mount in the direction of the input shaft of the transmission.

FIG. 8 is a vertical plan view looking from an opposite end as in FIG. 7, of the bearing mount of the transmission.

The same reference numerals are used to identify the same elements in the various figures.

DETAILED DESCRIPTION OF THE PREFERRED EMBODIMENT

Figure 4:
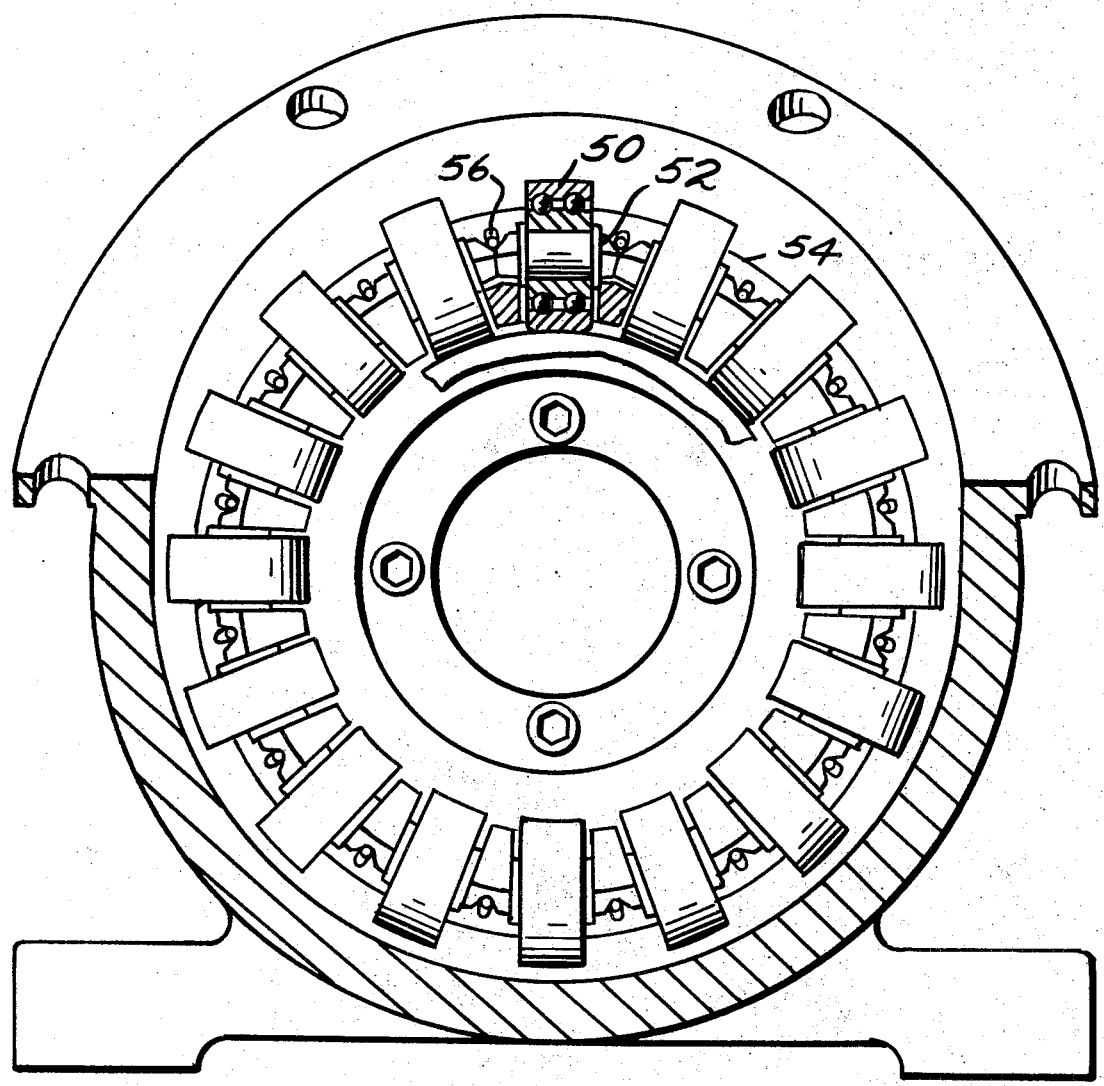
FIG. 4 is a cross-sectional view along line 4—4 in FIG. 1 with elements omitted for clarity.

Referring to FIG. 1, reference numeral 10 indicates a constant speed motor (not shown) having an output shaft 12 which serves as the input shaft to transmission 14 which is enclosed in housing 11. A sleeve 16 surrounds shaft 12 and is attached thereto by means of a key 18 and set screw 20. Integral with sleeve 16 and coaxial with shaft 12, is bevel pinion 22 which rotates at output speed of shaft 12 to transfer power from motor 10 to sphere 24, whose center lies on the input axis.

Sphere 24, in turn, is comprised of two segments, 26A and 26B. These are joined rigidly by mandrel 28 and keys 28A and 28B, becoming, in effect, a continuous hollow sphere except for a narrow slot between segments 26A and 26B. Sleeve 16 is greatly reduced in diameter to permit extending through this slot before enlarging to form pinion 22. Also extending through this slot, but hidden in FIG. 1 is a thin web which integrally joins that portion of bearing mount 32 which lies within sphere 24 to that outside sphere 24. The nature of bearing mount 32 is elsewhere shown in several mechanical views, discussed later. It should be understood that it supplies a support for the inner races of ball bearings 34A and 34B, while at the same time extending to the outside of sphere 24 where it is rotatably mounted on bearing 46, coaxial with input shaft 12.

It will be noted that the outer races of bearings 34A and 34B provide support for sphere segments 26A and 26B. We should also note that sphere 24 is driven by bevel pinion 22 through bevel gear 30. The result of all this is that we have a sphere 24 that is driven at a constant speed about an axis perpendicular to the input axis, and wherein this rotational axis of sphere 24 may be oriented to any angle about the input axis by turning bearing mount 32 about the input axis.

In FIG. 1, the axis of output shaft 58 supported in bearings 60 and 63, passes through the center of sphere 24 at an angle with the input axis. In a plane through the center of sphere 24 and perpendicular to the output axis lie the axes of a plurality of rollers 50 which frictionally engage sphere 24 in a series of contact points which lie in the great circle where this plane intersects sphere 24. Each roller 50 is mounted on a separate roller pin 52, as best seen in FIG. 4. All the roller pins 52 are arranged on output spider or ring 54 and urged into contact with sphere 24 by means of roller pin springs 56. Since output spider 54 is attached to output shaft 58, rotation applied to spider 54 through rollers 50 by means of sphere 24 is immediately transferred to output shaft 58.

It should be noted that although the means for supplying power to some other mechanism is here shown as an output shaft 58, it is within the concept of my invention to provide such other means as would be necessary to couple the power transmission to any such mechanism or to be built as an integral part therewith.

Referring to FIG. 2, it can be seen that orientation of bearing mount 32, and therefore of the rotational axis of sphere 24, about the input axis may be varied by manipulating handwheel 36. Motion of handwheel 36 is shown transmitted to bearing mount 32 through bevel pinion 40 and bevel gear 42, but other means would be equally suitable.

An analysis of the forces involved in this transmission shows that when motor 10 is transmitting power to output shaft 58, there is an inherent tendency for the rotational axis of sphere 24 to assume a position corresponding to zero output speed, that is, when the rotational axis of sphere 24 is perpendicular to the output axis. This tendency is transmitted back to handwheel 36 through bevel gear 42 and bevel pinion 40, so that handwheel 36 also tends to assume a position for zero output speed. A torque applied to handwheel 36 is required to hold it in a position corresponding to a given output speed. If this torque is removed, handwheel 36 returns to a position of zero output speed. The magnitude of the torque required to hold handwheel 36 in the position for a given output speed is proportional to the output torque. By applying a static torque to handwheel 36 which will be overbalanced when the output torque reaches some unacceptably high value, handwheel 36 will turn toward a zero speed position. Thus, we introduce an effective overload safety means.

A manner of accomplishing this objective is shown in FIGS. 2 and 3. Frictional pressure is applied to the stem of the handwheel 36 by screw 43, through spring 41, button 39 and split bushing 38. This arrangement continues to apply torque to handwheel 36 as the output speed lowers, and if the output torque falls off at the lower speed, the output speed will become stable at a lower value.

Other methods of accomplishing this objective are possible. A very desirable method is one not shown in which the restraining torque on handwheel 36 is completely released as soon as overcome by the output torque, in which case handwheel 36 and, of course, the rotational axis of sphere 24, assume the position of exact zero speed.

An important aspect of overload protective devices such as described is that they can be adjusted to definitely avoid slippage between rollers 50 and sphere 24, and thus prevent scoring. Comparable available transmissions do not have this feature.

A point of some consequence should be observed here. In this transmission, as previously noted, the input and output axes intersect at an angle. As this angle approaches 90° the torque transmitted from output shaft 58 to handwheel 36 approaches zero. Therefore, the overload safety means above described becomes less practicable as the angle between input and output axes near 90°.

The output speed of some available variable speed transmissions, particularly including electrical types, does not respond to variations of the position of the control element in the area of zero output speed. In this respect, the transmission herein described is distinctly superior. Slight deviations of the rotational axis of the sphere from its stable zero output speed position immediately produces a very low output speed, forward or reverse.

In comparable mechanical variable speed transmissions, the elements which correspond to rollers 50 are few in number and expensive. In this transmission, rollers 50 can be inexpensive ball bearings, and many in number. Each such element transmits torque to the output shaft through its contact point. With more such contact points than comparable devices have, the subject transmission can transmit more torque before slipping, a very important feature.

In FIG. 4, rollers 50 are seen to have a substantial width. This is desirable to permit bridging the slot between spherical segments 26A and 26B in FIG. 1. Thus, rollers 50 remain in contact with sphere 24 when passing over this slot.

In FIG. 4, the surface of rollers 50 is shown as cylindrical. In an alternative design, rollers 50 may be hollow ground to match sphere 24. This has some advantages and disadvantages. It provides a line contact instead of point contact between rollers 50 and sphere 24, thus, decreasing unit contact pressure, an advantage. Likewise, when rollers 50 thus ground, pass over the slot between spherical segments 26A and 26B, FIG. 1, they avoid the slight inward motion present with cylindrical grinding, which is a second advantage. However, slight slipping between rollers 50 when ground to match sphere 24 occurs at points along the line of contact, a disadvantage.

FIGS. 5, 6, 7 and 8 are mechanical views of bearing mount 32, provided to clarify its several functions. In FIG. 5, hole 66 is a clearance hole for inwardly projecting axial extensions of spherical segments 26A and 26B, rigidly joined by mandrel 28 as shown in FIG. 1, and no contact between sphere 24 and bearing mount 32 occurs here. Surfaces 68 and 70 provide mounting for the inner races of bearings 34A and 34B, FIG. 1. The thin section 72 passes between segments 26A and 26B, FIG. 1, without contact. A bored hole 74 is provided for accepting the outer race of bearing 48 which helps support bearing mount 32 coaxial with the input shaft 12, FIG. 1. In FIG. 6 and FIG. 5, surface 76 is machined to clear sphere 24. Again in FIG. 5, surface 78 accepts the inner race of bearing 46, FIG. 2, which together with bearing 48 permits orientation of bearing mount 32 about the input axis. Hole 80 is a clearance hole for sleeve 16, FIG. 1. Surface 82 accepts bevel gear 42, FIG. 2. Surface 84 provides mounting for scale 49, FIG. 2, which provides a visual indication of the position of the rotational axis of sphere 24, FIG. 1, and consequently output speed, through window 51, FIG. 2. In FIG. 7, surface 86 is machined to a diameter which clears the ring of rollers 50, FIG. 1, regardless of the orientation of bearing mount 32.

It will be noted that double row ball bearings are employed for rollers 50, FIG. 4. This is not mandatory but desirable, since such bearings have good resistance to the overturning moment due to the forces present where they contact sphere 24.

It should be noted that this transmission may be built integral with other mechanical equipment. For instance, in FIG. 1, spider 54 may be attached directly to the input shaft of a gear reducer. This would permit changing the speed range, and available output torque as desired.

Although the foregoing description illustrates the preferred embodiment of the present invention, it will be apparent to those skilled in the art that variations are possible. All such variations as would be obvious to those skilled in this art are intended to be included within the scope of this invention.

What is claimed is:

1. A power transmission device comprising an input shaft whose fixed axis intersects the fixed axis of an output means at an angle, the intersection being at the center of a sphere means which is rotated by said input shaft in fixed ratio about a diameter perpendicular to said axis of said input shaft, a ring means carried by said output means for transmitting motion from said sphere means to the output means, said ring means carrying a plurality of cylindrical rollers disposed tangentially in spaced relation around the ring and whose cylindrical surfaces frictionally engage the surface of the sphere means in a great circle perpendicular to said axis of said output means, and whose individual axes lie in the plane of said great circle, with the rotational axis of the sphere means being adjustable angularly about said input shaft, thereby permitting continuous variations of the angle between the rotational axis of said sphere means and the plane of said great circle from a maximum positive through zero to a maximum negative, and thereby imparting, through said cylindrical rollers a corresponding speed variation to said output means.

2. The power transmission device of claim 1 wherein said sphere means is hollow and is constructed of two equal segments, rigidly but detachably joined to a mandrel, said sphere means being mounted for rotation about the axis of said mandrel on internal ball bearings supported on a bearing mount which protrudes from the inside of the sphere means to the outside through a narrow equatorial slot between said segments of said sphere means and is externally mounted by means for permitting angular adjustment of said mandrel about the axis of said input shaft, and said sphere means being internally driven by a bevel pinion, attached to said input shaft which passes through said slot, the bevel pinion engaging a bevel gear attached to one of said segments.

3. The power transmission device of claim 2 wherein the angle between the rotational axis of said sphere means and the plane of the roller axes is manually controlled by means for turning said bearing mount around said input shaft, and thereby controlling the output speed of the device.

4. The power transmission device of claim 3 having an overload protective means for forcibly rotating said bearing mount about said axis of said input shaft and means for holding said bearing mount with a fixed torque in a position to give a desired output speed, the fixed torque being overcome when the output torque exceeds some predetermined value, thus permitting said bearing mount to tend toward its natural resting position, corresponding to zero output speed.

5. The power transmission device of claim 2 wherein the cylindrical rollers are held against the surface of said sphere means with means for supplying a predetermined yieldable pressure, thus providing the frictional engagement between rollers and sphere means.

6. The power transmission device of claim 5 wherein said cylindrical rollers are sufficiently wide to bridge said slot between said segments so that said rollers may not drop into said slot during traverse, but rather engage the edges of said segments.

7. The power transmission device of claim 5 wherein the faces of said rollers are hollow ground to match said sphere means, thereby providing line contact instead of point contact between said roller and said sphere means and also preventing a slight inward motion of said rollers when said slot between said segments is bridged.

8. The power transmission device of claim 3 wherein the angular orientation of the rotational axis of said sphere means about said axis of said input shaft is readable on a scale, as an indication of output speed.

9. The power transmission device of claim 1 wherein said output means is a shaft attached at one end to said ring means, and having means at another end thereof for coupling to other mechanical equipment to provide power therefore.

* * * * *